US009235931B2

(12) United States Patent
Benameur et al.

(10) Patent No.: US 9,235,931 B2
(45) Date of Patent: Jan. 12, 2016

(54) METHOD AND SYSTEM FOR THE THREE-DIMENSIONAL RECONSTRUCTION OF STRUCTURES

(71) Applicants: Said Benameur, Anjou (CA); Frédéric Lavoie, Ste-Martine (CA)

(72) Inventors: Said Benameur, Anjou (CA); Frédéric Lavoie, Ste-Martine (CA)

(73) Assignee: EIFFEL MEDTECH INC., Montréal (QC) (CA)

( * ) Notice: Subject to any disclaimer, the term of this patent is extended or adjusted under 35 U.S.C. 154(b) by 98 days.

(21) Appl. No.: 13/897,346

(22) Filed: May 17, 2013

(65) Prior Publication Data

US 2014/0341454 A1    Nov. 20, 2014

Related U.S. Application Data

(60) Provisional application No. 61/688,629, filed on May 18, 2012.

(51) Int. Cl.
*G06K 9/00* (2006.01)
*G06T 17/00* (2006.01)
*G06T 7/00* (2006.01)
*G06T 7/40* (2006.01)

(52) U.S. Cl.
CPC ............ *G06T 17/00* (2013.01); *G06T 7/0032* (2013.01); *G06T 7/0065* (2013.01); *G06T 7/0081* (2013.01); *G06T 7/401* (2013.01); *G06T 2207/10132* (2013.01)

(58) Field of Classification Search
None
See application file for complete search history.

(56) References Cited

U.S. PATENT DOCUMENTS

| | | | | |
|---|---|---|---|---|
| 5,748,491 | A * | 5/1998 | Allison et al. | 702/22 |
| 5,776,063 | A * | 7/1998 | Dittrich et al. | 600/408 |
| 6,295,504 | B1 * | 9/2001 | Ye et al. | 702/7 |
| 7,639,866 | B2 * | 12/2009 | Pomero | G06T 7/0046 382/128 |
| 7,786,433 | B2 * | 8/2010 | Gunzert-Marx et al. | 250/252.1 |
| 8,105,237 | B2 * | 1/2012 | Waters et al. | 600/437 |
| 8,295,575 | B2 * | 10/2012 | Feldman et al. | 382/131 |
| 2002/0049379 | A1 * | 4/2002 | Adam et al. | 600/437 |
| 2002/0061126 | A1 * | 5/2002 | Gerard | G06F 19/321 382/128 |
| 2008/0289423 | A1 * | 11/2008 | Gordon et al. | 73/602 |
| 2012/0071758 | A1 * | 3/2012 | Lachaine | A61B 8/085 600/439 |
| 2012/0265496 | A1 * | 10/2012 | Mahfouz | 703/1 |

OTHER PUBLICATIONS

Huang et al (Deformable model based tectured object segmentation), May 2003.*

(Continued)

*Primary Examiner* — Nancy Bitar
(74) *Attorney, Agent, or Firm* — Equinox IP; Franz Bonsang, Patent Agent

(57) ABSTRACT

A system and method for the 3D reconstruction of a structure, the method comprising: obtaining at least two calibrated 2D bi-planar images of the structure, associating with each pixel each of the images a textural vector characterizing the distribution of the gradient texture and orientation in a window centered around the pixel, applying a non-linear statistical dimensionality reduction procedure to the textural vectors to obtain reduced dimension textural vectors, creating segmented images of the images using the reduced dimension textural vectors, projecting the representative 3D model onto the segmented images, adjusting the projection of the representative 3D model with the contours and homogeneous zones of the segmented images using the optimization of a cost function to obtain the 3D reconstruction of the structure.

18 Claims, 2 Drawing Sheets

(56) References Cited

OTHER PUBLICATIONS

Koehler C et al, "Knowledge-Assisted Reconstruction of the Human Rib Cage and Lungs", IEEE Computer Graphics and Applications, IEEE Service Center, New York, NY, US, Jan. 1, 2010, vol. 30, No. 1, ISSN 0272-1716, p. 17-29 USA.

Max Mignotte, "MDS-Based Multiresolution Nonlinear Dimensionality Reduction Model for Color Image Segmentation", IEEE Transactions on Neural Networks, IEEE Service Center, Piscataway, NJ, US, Mar. 1, 2011, vol. 22, No. 3, doi:10.1109/TNN.2010.2101614, ISSN 1045-9227, p. 447-460 USA.

Benameur S et al, "A hierarchical statistical modeling approach for the unsupervised 3-D biplanar reconstruction of the scoliotic spine", IEEE Transactions on Biomedical Engineering, IEEE Service Center, Piscataway, NJ, USA, Dec. 1, 2005, vol. 52, No. 12, ISSN 0018-9294, p. 2041-2057 1-16 p. 2048 , p. 2043 USA.

\* cited by examiner

METHOD AND SYSTEM FOR THE THREE-DIMENSIONAL RECONSTRUCTION OF STRUCTURES

CROSS-REFERENCE TO RELATED APPLICATIONS

This application claims the benefits of Canadian patent application No. 2,778,347 filed on May 17, 2012, and U.S. provisional patent application No. 61/688,629 filed on May 18, 2012, which are herein incorporated by reference.

TECHNICAL FIELD

The present disclosure relates to a method and system for the three-dimensional reconstruction of structures. More specifically, the present disclosure relates to a method and system for the three-dimensional reconstruction of anatomical structures such as bones.

BACKGROUND

Methods of three-dimensional (3D) reconstruction associated with Computerized Tomography (CT) scan or Magnetic Resonance Imaging (MRI) systems provide accurate 3D reconstructions of human bone structures. However, CT-scan systems submit the patient to high radiation levels. In addition, a large volume of information needs to be processed and the patient is required to lie down for an extended period of time during examination, which does not allow for the observations of deformations when the patient is standing and under the influence of gravity. Although the MRI systems do not submit the patient to high radiation levels, they possess the same last two disadvantages of CT-scan systems. Another imaging technique, completely harmless to the patient is ultrasound imaging. The latter non-invasive technique, however, is not very suitable for the analysis of 3D geometry of the bone structure because they generate too much echo and measurement noise (parasitic echoes to the geometric surface shape of dense structures).

The problem of 3D multi-planar reconstruction, which consists of reconstructing a 3D anatomical structure from multiple radiographic views, belongs to the class of ill-posed problems in the sense of Hadamard. For example, the acquisition of two bi-planar radiographic images provides a set of incomplete data that does not ensure the uniqueness of the solution.

Accordingly, there is a need for to a method and system for the 3D reconstruction of structures and more specifically anatomical structures that addresses the above-described shortcomings.

SUMMARY

The present disclosure provides a method for the 3D reconstruction of a structure, the method comprising:
  obtaining at least two calibrated 2D bi-planar images of the structure;
  associating with each pixel each of the at least two calibrated 2D bi-planar images a textural vector characterizing the distribution of the gradient texture and orientation in a window centered around the pixel;
  applying a non-linear statistical dimensionality reduction procedure to the textural vectors to obtain reduced dimension textural vectors;
  creating segmented images of the at least two calibrated 2D bi-planar images using the reduced dimension textural vectors;
  projecting the representative 3D model of the structure onto the segmented images;
  adjusting the projection of the representative 3D model with the contours and homogeneous zones of the segmented images using the optimization of a cost function to obtain the 3D reconstruction of the structure.

The present disclosure further provides a method for the 3D reconstruction of a structure as above further comprising providing the representative 3D model of the structure using a learning set containing a plurality of structure surface models by:
  associating with each structure surface model a shape vector characterizing the shape of the structure surface model in 3D;
  applying a non-linear statistical dimensionality reduction procedure to the shape vectors to obtain reduced dimension shape vectors;
  selecting a point in the reduced dimension space;
  varying the reduced dimension shape vector corresponding to the selected point by a predefined interval;
  selecting a predefined number of closest neighboring points to the selected point; and
  providing the representative 3D model by interpolation using the shape vectors associated with the closest neighboring points to the selected point;
wherein the predefined number of closest neighboring points is a function of the degree of the interpolation.

The present disclosure also provides a system for the 3D reconstruction of a structure, comprising:
  an input/output interface configured to receive at least two calibrated 2D bi-planar images;
  a processor in communication with the input/output interface, the processor configured for:
    associating with each pixel each of the at least two calibrated 2D bi-planar images a textural vector characterizing the distribution of the gradient texture and orientation in a window centered around the pixel;
    applying a non-linear statistical dimensionality reduction procedure to the textural vectors to obtain reduced dimension textural vectors;
    creating segmented images of the at least two calibrated 2D bi-planar images using the reduced dimension textural vectors;
    projecting the representative 3D model of the structure onto the segmented images;
    adjusting the projection of the representative 3D model with the contours and homogeneous zones of the segmented images using the optimization of a cost function to obtain the 3D reconstruction of the structure.

The present disclosure further provides a system for the 3D reconstruction of a structure as above, further comprising a database having stored therein a learning set containing a plurality of structure surface models and wherein the processor is further configured for:
  associating with each structure surface model a shape vector characterizing the shape of the structure surface model in 3D;
  applying a non-linear statistical dimensionality reduction procedure to the shape vectors to obtain reduced dimension shape vectors;
  selecting a point in the reduced dimension space;
  varying the reduced dimension shape vector corresponding to the selected point by a predefined interval;

selecting a predefined number of closest neighboring points to the selected point; and providing the representative 3D model by interpolation using the shape vectors associated with the closest neighboring points to the selected point;

wherein the predefined number of closest neighboring points is a function of the degree of the interpolation.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiment of the present disclosure provides a method and system for the three dimensional (3D) reconstruction of structures, more specifically anatomical structures such as bones. In the present disclosure, for illustrative purposes, the example of anatomical structures will be used, more precisely bones of the human body, but it is to be understood that the system and method can be used for other types of structures.

The 3D reconstruction is achieved using calibrated bi-planar images of the anatomical structure from a two dimensional (2D) imaging system and a priori knowledge of the overall geometrical structure of each structure, e.g. anatomical structure or bone. This knowledge comes from a surface model learning set of considerable size, allowing modeling to take into account the anatomical variability and those related to diseases of the anatomical structures, to which is applied non-linear statistical dimension reduction, for example using the Multi-Dimensional Scaling (MDS) algorithm. The MDS algorithm allows the finding of a subspace of small dimension which preserves the metric chosen in the original space. This step allows the defining of a mesh deformation in a reduced dimensional space in which each point of the grid corresponds to a surface model of the learning set. This network in turn allows the defining of a concise 3D reconstruction parametric model in which all statistically admissible deformations from the learning set will be the values of a reduced parameter vector.

The 3D reconstruction method then consists in adjusting the projections of an anatomical structure surface model with the contours and region (homogeneous zones) of the segmented images, comprising the corresponding anatomical structure, in the bi-planar images. The 3D reconstruction problem can thus be viewed as a problem of estimation of deformation parameters of a surface model or as a problem of minimizing a cost functions of dimension d. This minimization can be achieved by a stochastic algorithm.

Figure 1:
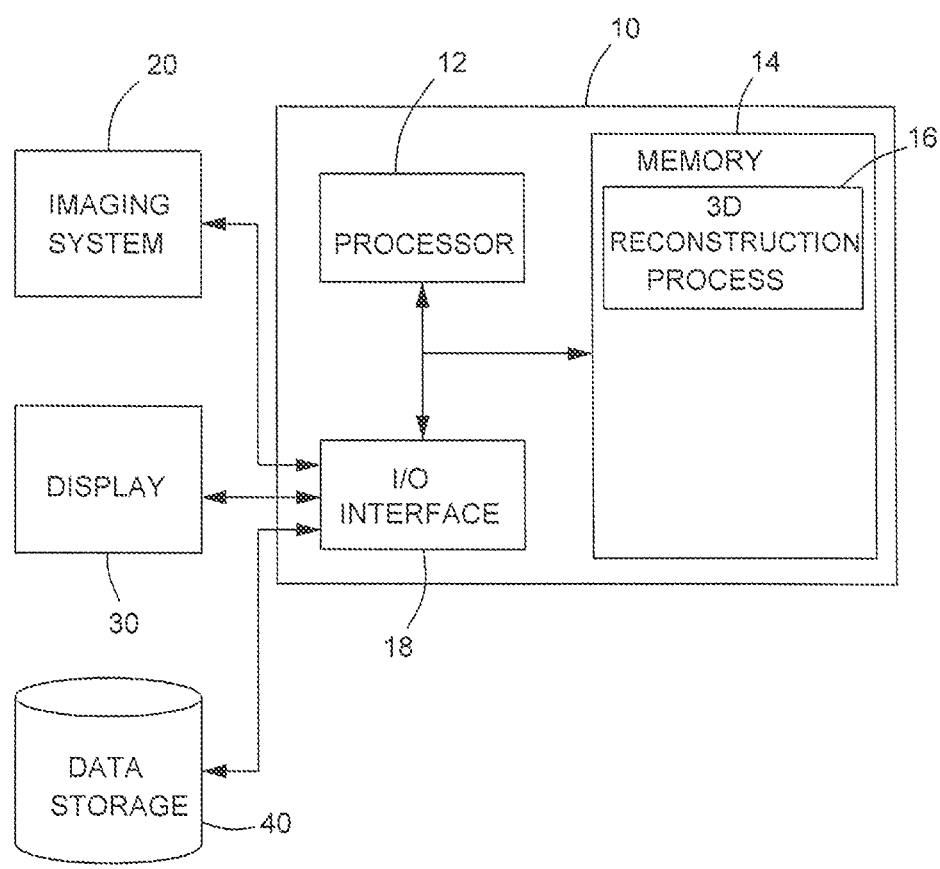
FIG. 1 is a schematic representation of a three-dimensional reconstruction system in accordance with an illustrative embodiment of the present disclosure.

Referring to FIG. 1, the 3D reconstruction system 10 includes a processor 12 with an associated memory 14 having stored therein processor executable instructions 16 for configuring the processor 12 to perform various processes, namely the 3D reconstruction process, which process will be further described below. The image restoration system 10 further includes an input/output (I/O) interface 18 for communication with a 2D imaging system 20 and a display 30.

The 3D reconstruction system 10 obtains at least two bi-planar images of the anatomical structure from the 2D imaging system 20 and executes the 3D reconstruction process on the acquired images. The resulting 3D reconstruction is then displayed on the display 30 and may be saved to the memory 14, to other data storage devices or medium 40, or provided to a further system via the I/O interface 18.

The application of Principal Component Analysis (PCA) and/or a mixture of probabilistic PCA can be viewed as a problem of linear or locally linear dimensionality reduction. Specifically, it consists of an orthogonal projection onto a subspace of the original space.

Briefly recalling some basic ideas of the PCA, let $\{x_i \in R^d\}_{i=1, \ldots, l}$ be a set of observations described by d attributes. The PCA performs "optimal" graphic presentation of the observations minimizing the deformation of the cloud of points in a subspace of dimension q<d. Let X be the matrix of observations. For centric data, the variance of the principal component $c_k = X p_k$ where $p_k$ is a unit vector of the variance matrix $\Sigma = 1/l X^t X$, is equal to the value $\lambda_k$ associated with vector $p_k$. The main components are centered, de-correlated and are the projection of X on the factorial axes of the maximum variance. PCA is a method of linear projection of the data in a space of reduced dimension. The main components are new variables formed by the linear combination of the initial variables.

Linear methods are not effective when the data are not distributed in a linear sub-space of the original space. To overcome this problem, many algorithms for non-linear dimensionality reduction have been developed. These algorithms are generally based on the idea that there is a non-linear sub-space that contains the data distribution. Among the algorithms proposed in the literature, the most popular are the Isomap, the Multi-Dimensional Scaling (MDS), Locally Linear Embedding (LLE), Semi-Definite Embedding (SDE) and t-Distributed Stochastic Neighbor Embedding (t-SNE). In the illustrative embodiment of the present disclosure, the approach used is the MDS but it is to be understood that in alternative embodiments other non-linear dimensionality reduction approaches may also be used.

In the MDS statistical approach used in the illustrative embodiment, let there be l observations described by d attributes. Let X be the matrix of the observations ($x_i \in R^d$):

$$X = \begin{pmatrix} x_{1,1} & \cdots & x_{1,d} \\ \vdots & \ddots & \vdots \\ x_{l,1} & \cdots & x_{l,d} \end{pmatrix} \qquad \text{Equation 1}$$

$$= \begin{pmatrix} x_1^t \\ \vdots \\ x_l^t \end{pmatrix}$$

The observations can be transformed into data-centric and reduced by using the similarity between observations. The distance matrix $\Delta$ defined by ($d_{ij}$) where $d(x_i, x_j) = \|x_i - x_j\|_{l_2}$. The goal is to find a configuration of points $y_i$ with $i \in \{1, \ldots, l\}$ in a space of smaller dimension which retains the distances between initial points $x_i$. In other words, we look for $y_i \in R^q$, q<d such that $d(y_i, y_j) \approx d_{ij}$ with $d_{ij} = d(x_i, x_j)$. This results in an optimization function J defined by:

$$J = \Sigma_{i=1}^{l} \Sigma_{j=1}^{l} (d_{ij} - d(y_i, y_j))^2 \qquad \text{Equation 2}$$

The classical MDS algorithm can be achieved either by classical optimization methods (e.g. gradient descent or equivalent) or by algebraic methods, which can be briefly recalled as:

From the distance matrix Δ, build the matrix M where M=HAH, $$H = I_l - \frac{1}{l} 1_l 1_l^t, \ 1_l$$
$$= ( 1 \ \ldots \ 1 )^t \in R^l \ et \ A$$
$$= -\frac{1}{2} d_{ij}^2.$$

Perform the spectral decomposition of de M∈R$^{l \times l}$ where M=WΛW$^t$, W=[u$_1$ ... u$_l$]∈R$^{l \times l}$ et Λ=diag(λ$_1$ ... λ$_l$). The matrix M has at most $d$ zero eigenvalues (assuming of course that l>d).

For a configuration of points in a space of reduced dimension q, simply then consider $$Y = V \Lambda_d^{\frac{1}{2}}$$

where V=[u$_1$ ... u$_q$], q<d is the matrix of q eigenvectors and Λ$_q$=diag(λ$_1$ ... λ$_q$) is the diagonal matrix of eigenvalues q. The structure of Y is Y=[y$_1$ ... y$_l$]$^t$∈R$^{l \times q}$ and the new variable y$^l$ is λu$_j$ where j∈{1, ..., q}.

The best strategies to achieve the MDS of data are to first use an algebraic method, imprecise but fast, and then use the resulting solution as initialization of an optimization method based on a gradient descent procedure or stochastic local exploration. This combination of analytical and algebraic methods of optimization provides an excellent compromise between computational speed and accuracy of the proposed solution.

The MDS is widely used for data visualization, for example, in the field of the analysis of functional Magnetic Resonance Imaging (MRI), in molecular modeling or hyperspectral imaging. The popularity of MDS gave variants as Stochastic Proximity Embedding (SPE), Curvilinear Component Analysis (CCA), SNE and FastMap.

The 3D reconstruction process uses a segmentation method that takes into account both the notion of contour and region (detection of homogeneous zones). Cooperation between segmentation by region and contours contributes to an improved consideration of the characteristics of the anatomical structures in the images and, therefore, better segmentation thanks to the complementary nature of these two types of information. Thus, segmentation by region-contour cooperation can be expressed as a support between these two concepts in order to improve the final segmentation result.

In an anatomical structure image, only the size and more specifically the texture (i.e. distribution or statistical distribution) of the image gradient of each region present in the image is a discriminant information to distinguish bones from muscles. Indeed, the bones have a gradient distribution with uniform orientation and muscles, a distribution gradient with a longitudinal orientation (corresponding to the direction of muscle fibers) and smaller amplitude. A requantized histogram of the amplitude and direction of the gradient is a discriminant information to segment the image (i.e. differentiate the different regions), which is then used for localization and 3D reconstruction.

Accordingly, the segmentation method used by the 3D reconstruction process is based on the distribution of gradient texture and a non-linear MDS dimensionality reduction. For each pixel (i,j) of each of the bi-planar images of size L×H will be associated a vector of dimension D, having characteristics including parameters characterizing the gradient distribution of texture and orientation (considered in a small window centered about the pixel). In this context, the use of the non-linear MDS dimensionality reduction statistical method will non-linearly reduce the L×H textural (gradient) vectors of dimension D associated with each pixel of the images in a space of dimension d (with d<<D) maintaining "as best as can be" the considered distances (Euclidean or Bhattacharya). This procedure can be done using a multi-resolution approach similar to that proposed in M. Mignotte, "MDS-based multi-resolution nonlinear dimensionality reduction model for color image segmentation", IEEE Transactions on Neural Networks, 22 (3):447-460, March 2011, which is herein incorporated by reference. This dimensionality reduction will result in the optimization of a cost function where will be introduced, in addition, to reflect the contours, a weighting factor to encourage the pairing of pixels which are not separated by a contour and thus promote consistency between pixels in a region. This dimensionality reduction with, for example, d=1 will lead to a viewable grayscale image where different regions appear with reduced values and very different levels of gray for which a simple K-means clustering will reliably segment (and quickly) the image into two classes.

This non-linear dimensionality step allows the defining of a deformation mesh in a reduced dimensional space in which each point of the grid will actually represent a surface model of the learning set. This in turn allows the defining of a concise 3D reconstruction parametric model in which all eligible and statistically learned deformations from the learning set will be the values of a reduced vector of d parameters.

From this deformation non-linear mesh summarizing all statistically eligible surface structures, the 3D reconstruction process consist then in the adjustment of the projections of an anatomical structure surface model (contained in this deformation mesh and by interpolation) with the contours of the segmented image, comprising the corresponding anatomical structure, by the method proposed in F. Destrempes, M. Mignotte, J.-F. Angers, "Localization of shapes using statistical models and stochastic optimization", IEEE Transactions on Pattern Analysis and Machine Intelligence, 29 (9):1603-1615, September 2007, which is herein incorporated by reference.

This 3D reconstruction process is based on a likelihood using a contour pre-detection as well on a global constraint using the concept of specificity. This property is based on the fact that labels (of classes), provided by a textural pre-segmentation of the image, inside and outside of the form are different (or specific to a neighborhood of the object). This feature allows the basing of the likelihood of the Bayesian model on attributes that have the property to be very robust to noise.

The problem of 3D reconstruction is then seen as a simple problem of deformation parameters estimation of the surface model or, equivalently, as a problem of minimizing a cost function of dimension d. This minimization can be achieved by a stochastic algorithm.

Figure 2:
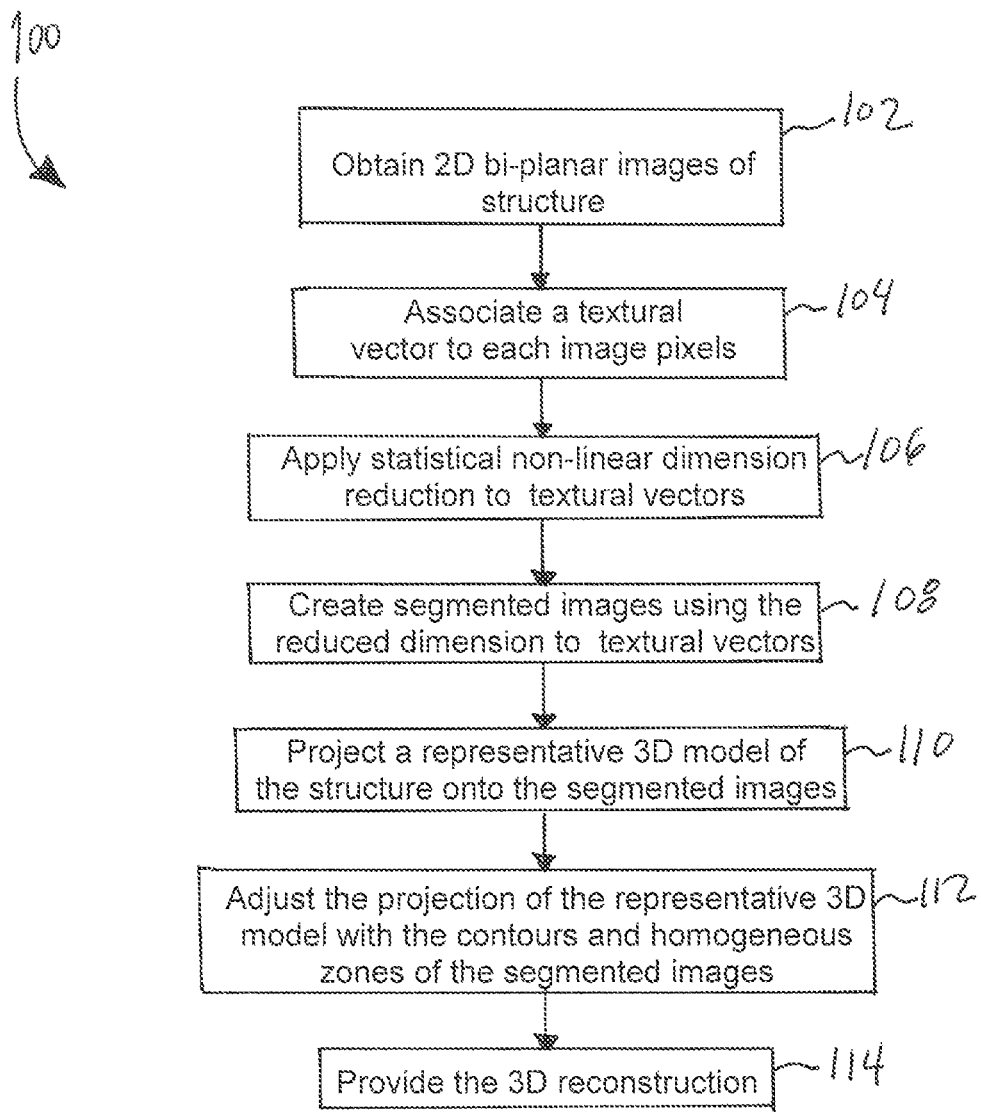
FIG. 2 is a flow diagram of a three-dimensional reconstruction process in accordance with an illustrative embodiment of the present disclosure.

Referring to FIG. 2, there is shown a flow diagram of an illustrative example of the 3D reconstruction process 100 executed by the processor 12 (see FIG. 1). Steps of the process 100 are indicated by blocks 102 to 114.

The process 100 starts at block 102 where at least two 2D bi-planar images of a structure, for example an anatomical structure of a patient, are obtained from the imaging system 20.

Then, at block 104, a textural vector is assigned to each pixel of each of the at least two bi-planar images. The dimension D of the textural vectors on the quantization used for the gradient and orientation parameters. For example, using four (4) quantization intervals for the gradient (i.e. [0, 63],]63, 128],]128, 184],]184, 255]) and four (4) quantization intervals for the orientation (i.e. [0, $\pi/4$],]$\pi/4$, $\pi/2$],]$\pi/2$, $3\pi/2$],]$3\pi/2$, $\pi$]), each vector with be of a dimension D=16 (each combination of gradient and orientation will be assigned a value representing the number of neighboring pixels having that specific combination).

At block 106, a non-linear statistical dimensionality reduction procedure is applied to the textural vectors to reduce their dimension to d for example d=2. Examples of procedures that may be used include Isomap, Multi-Dimensional Scaling, Locally Linear Embedding, Semi-Definite Embedding and t-Distributed Stochastic Neighbor Embedding.

At block 108, segmented images of the at least two calibrated 2D bi-planar images are created using the reduced dimension textural vectors.

Then, at block 110, the representative 3D model of the structure is projected onto the segmented images and, at block 112, the projection of the representative 3D model is adjusted with the contours and homogeneous zones of the segmented images using the optimization of a cost function to obtain the 3D reconstruction of the structure.

Finally, at block 114, the 3D reconstruction of the structure is provided.

The representative 3D model of the structure can be obtained using a learning set. The learning set contains, for each type of structure, a plurality of associated structure surface models. Associated with each structure surface model is a shape vector characterizing the shape of the structure surface model in 3D. A non-linear statistical dimensionality reduction procedure is then applied to the shape vectors to obtain reduced dimension shape vectors. A point in the reduced dimension space is then selected and then its corresponding reduced dimension shape vector is varied by a predefined interval. A predefined number of closest neighboring points to the selected point are then selected and the representative 3D model is then provided by interpolation using the shape vectors associated with the closest neighboring points to the selected point. It is to be understood that the predefined number of neighboring points to the selected point is a function of the degree of the interpolation.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed is:

1. A method for the 3D reconstruction of a structure, the method comprising:
    obtaining at least two calibrated 2D bi-planar images of the structure;
    associating with each pixel each of the at least two calibrated 2D bi-planar images a textural vector characterizing the distribution of the gradient texture and orientation in a window centered around the pixel;
    applying a non-linear statistical dimensionality reduction procedure to the textural vectors to obtain reduced dimension textural vectors;
    creating segmented images of the at least two calibrated 2D bi-planar images using the reduced dimension textural vectors;
    projecting the representative 3D model of the structure onto the segmented images;
    adjusting the projection of the representative 3D model with the contours and homogeneous zones of the segmented images using the optimization of a cost function to obtain the 3D reconstruction of the structure.

2. The method of claim 1, wherein the structure is an anatomical structure.

3. The method of claim 2, wherein the anatomical structure is a bone.

4. The method of claim 1, further comprising selecting the representative 3D model of the structure from a learning set containing a plurality of structure surface models.

5. The method of claim 1, wherein the non-linear statistical dimensionality reduction procedure is selected from a group consisting of Isomap, Multi-Dimensional Scaling, Locally Linear Embedding, Semi-Definite Embedding and t-Distributed Stochastic Neighbor Embedding.

6. The method of claim 1, further comprising providing the representative 3D model of the structure using a learning set containing a plurality of structure surface models by:
    associating with each structure surface model a shape vector characterizing the shape of the structure surface model in 3D;
    applying a non-linear statistical dimensionality reduction procedure to the shape vectors to obtain reduced dimension shape vectors;
    selecting a point in the reduced dimension space;
    varying the reduced dimension shape vector corresponding to the selected point by a predefined interval;
    selecting a predefined number of closest neighboring points to the selected point; and
    providing the representative 3D model by interpolation using the shape vectors associated with the closest neighboring points to the selected point;
wherein the predefined number of closest neighboring points is a function of the degree of the interpolation.

7. The method of claim 6, wherein the representative 3D model is selected from a plurality of proposed representative 3D models associated with respective points in the reduced dimension space.

8. The method of claim 6, wherein the non-linear statistical dimensionality reduction procedure is selected from a group consisting of Isomap, Multi-Dimensional Scaling, Locally Linear Embedding, Semi-Definite Embedding and t-Distributed Stochastic Neighbor Embedding.

9. A system for the 3D reconstruction of a structure, comprising:
    an input/output interface configured to receive at least two calibrated 2D bi-planar images;
    a processor in communication with the input/output interface, the processor configured for;
        associating with each pixel each of the at least two calibrated 2D bi-planar images a textural vector characterizing the distribution of the gradient texture and orientation in a window centered around the pixel;
        applying a non-linear statistical dimensionality reduction procedure to the textural vectors to obtain reduced dimension textural vectors;

creating segmented images of the at least two calibrated 2D bi-planar images using the reduced dimension textural vectors;

projecting the representative 3D model of the structure onto the segmented images;

adjusting the projection of the representative 3D model with the contours and homogeneous zones of the segmented images using the optimization of a cost function to obtain the 3D reconstruction of the structure.

10. The system of claim 9, further comprising:

a display in communication with the input/output interface, the input/output interface being further configured to provide the 3D reconstruction of the structure to the display.

11. The system claim 9, further comprising:

a 2D imaging system in communication with the input/output interface, the 2D imaging system providing the at least two calibrated 2D bi-planar images to the input/output interface.

12. The system of claim 9, wherein the structure is an anatomical structure.

13. The method of claim 12, wherein the anatomical structure is a bone.

14. The system of claim 9, wherein the processor is further configured for selecting the representative 3D model of the structure from a learning set containing a plurality of structure surface models.

15. The system of claim 9, wherein the non-linear statistical dimensionality reduction procedure is selected from a group consisting of Isomap, Multi-Dimensional Scaling, Locally Linear Embedding, Semi-Definite Embedding and t-Distributed Stochastic Neighbor Embedding.

16. The system of claim 9, further comprising a database having stored therein a learning set containing a plurality of structure surface models and wherein the processor is further configured for:

associating with each structure surface model a shape vector characterizing the shape of the structure surface model in 3D;

selecting a point in the reduced dimension space;

varying the reduced dimension shape vector corresponding to the selected point by a predefined interval;

selecting a predefined number of closest neighboring points to the selected point; and providing the representative 3D model by interpolation using the shape vectors associated with the closest neighboring points to the selected point;

wherein the predefined number of closest neighboring points is a function of the degree of the interpolation.

17. The system of claim 16, wherein the representative 3D model is selected from a plurality of proposed representative 3D models associated with respective points in the reduced dimension space.

18. The system of claim 16, wherein the non-linear statistical dimensionality reduction procedure is selected from a group consisting of Isomap, Multi-Dimensional Scaling, Locally Linear Embedding, Semi-Definite Embedding and t-Distributed Stochastic Neighbor Embedding.

* * * * *